Oct. 21, 1969 A. L. JACOBSON 3,474,408
NATURAL RESPONSE INDICATOR AND SYSTEM
Filed Sept. 27, 1966 3 Sheets-Sheet 1
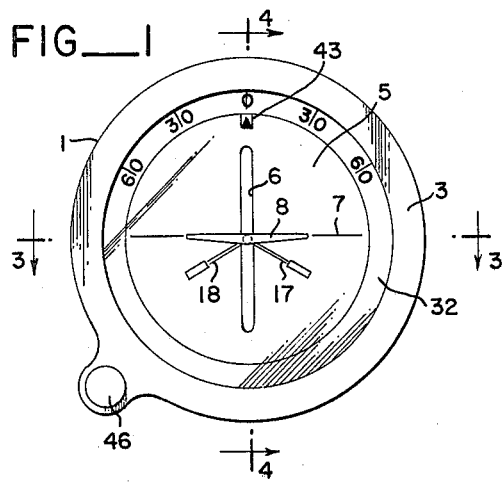
FIG_1
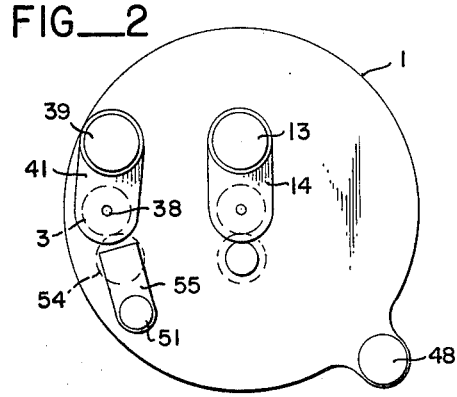
FIG_2
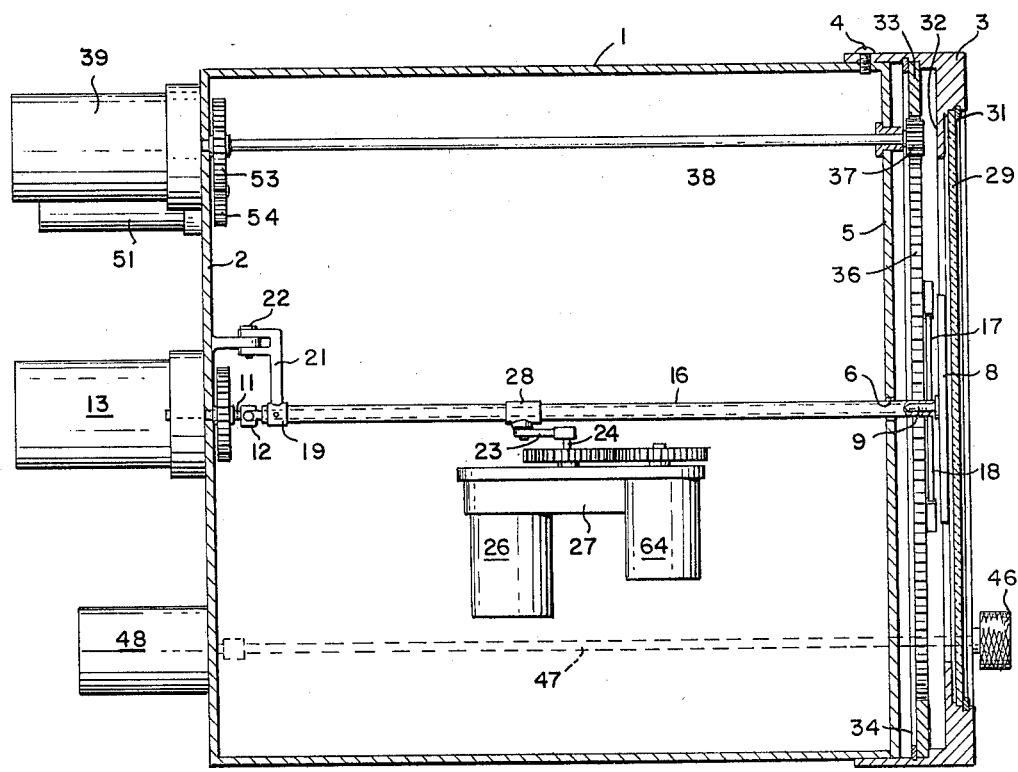
FIG_3
ARTHUR L. JACOBSON
INVENTOR.
BY
ATTORNEYS Oct. 21, 1969 A. L. JACOBSON 3,474,408
NATURAL RESPONSE INDICATOR AND SYSTEM
Filed Sept. 27, 1966 3 Sheets-Sheet 2
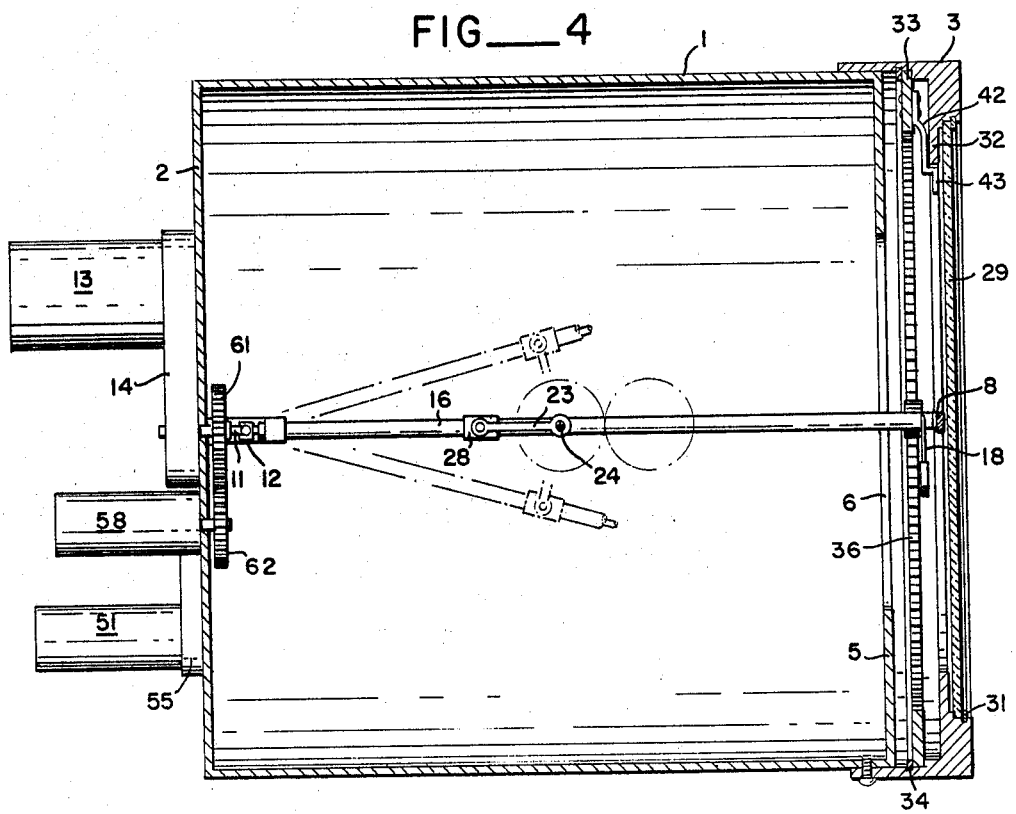
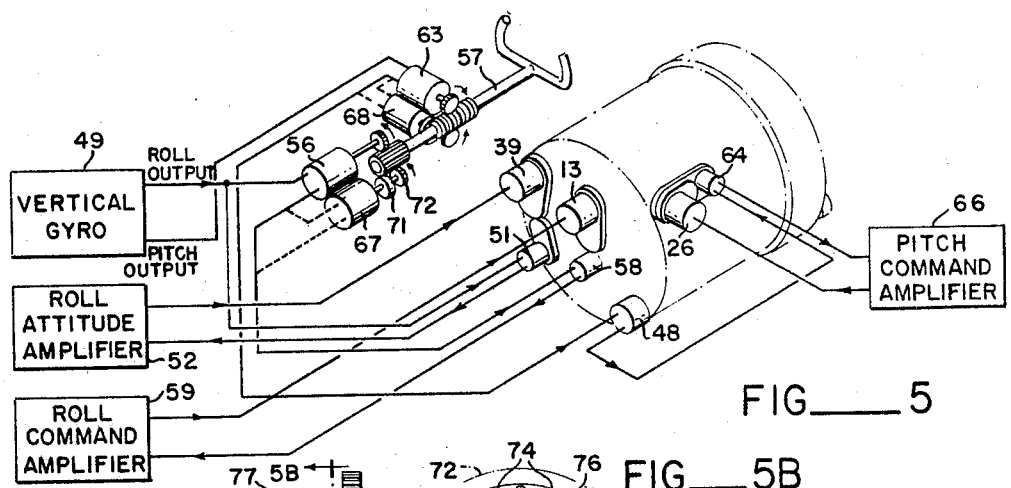
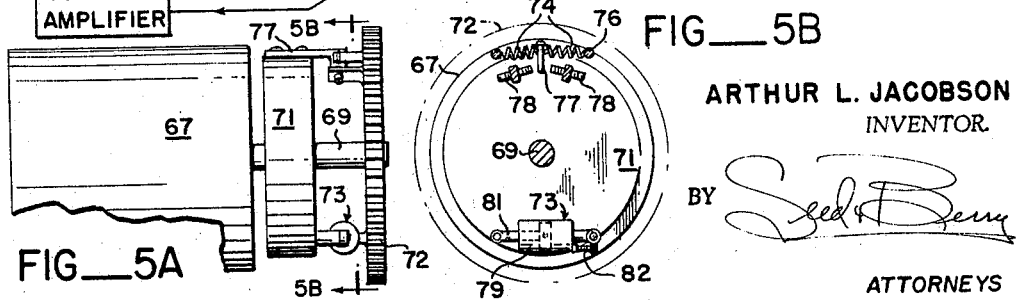
ARTHUR L. JACOBSON
INVENTOR.
BY *Seed & Berry*
ATTORNEYS FIG__6 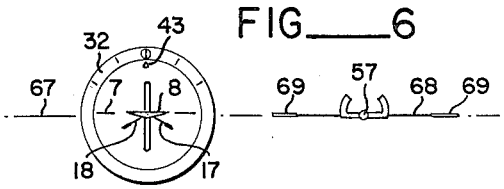
FIG__13 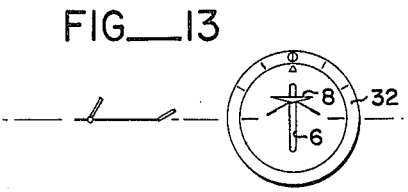
FIG__7 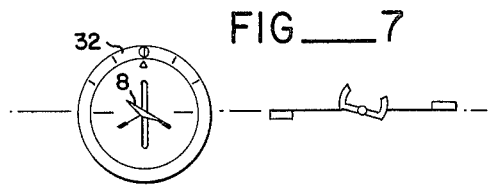
FIG__14 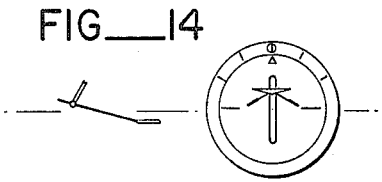
FIG__8 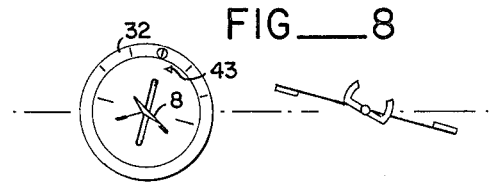
FIG__15 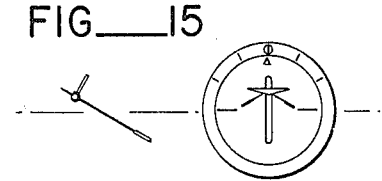
FIG__9 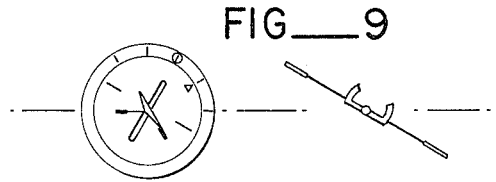
FIG__16 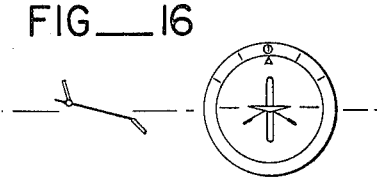
FIG__10 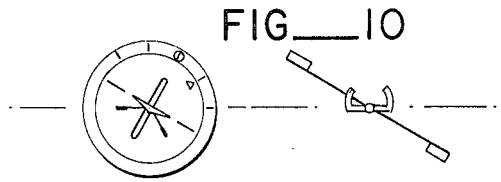
FIG__17 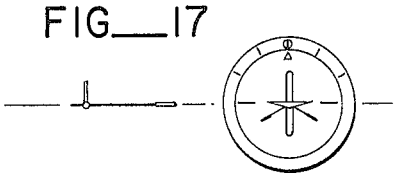
FIG__11 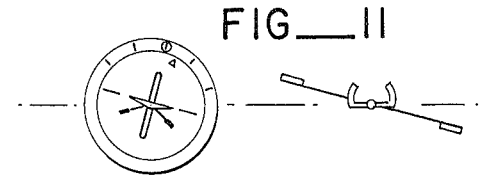
FIG__18 
FIG__12 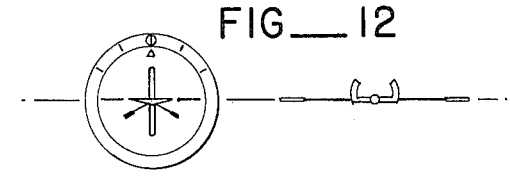
ARTHUR L. JACOBSON
INVENTOR.
BY 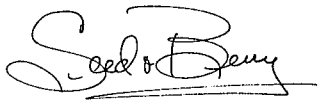
ATTORNEYS

United States Patent Office 3,474,408
Patented Oct. 21, 1969

3,474,408
NATURAL RESPONSE INDICATOR AND SYSTEM
Arthur L. Jacobson, 8424 85th Place SE.,
Mercer Island, Wash. 98040
Filed Sept. 27, 1966, Ser. No. 582,280
Int. Cl. B64d 43/02
U.S. Cl. 340—27                                                               10 Claims The present invention relates to instruments and systems for assisting a pilot or operator in controlling the attitude of a vehicle relative to a fixed reference in space. More particularly, the present invention relates to an improved instrument and system whereby the visual indicator portion of the instrument is simplified and reflects both actual and command (pilot controlled) roll and pitch attitude information by means of a single indicator member which rotates about a simulated roll axis and moves vertically in a straight line substantially flat arc to indicate pitch.

Accordingly an object of the present invention is to provide an instrument and system of the character described wherein the movable indicator element indicates roll information about a roll axis and pitch information by vertical movement in a straight line along a substantially flat arc with a sine wave motion which enables pitch information as well as roll information to be visually indicated through a full 360° roll and pitch attitude through 360° of pitch change except for minor anomalies near the vertical extremes of pitch rotation which will be further described.

Another object of the present invention is to provide an instrument and system of the character described wherein the indicator element is influenced by both the actual attitude of the vehicle about its pitch and roll axes and the position of the vehicle controls under the command of the pilot.

Another object of the present invention is to provide an instrument and system of the character described wherein actual attitude information and pilot control command information about both the roll and pitch axes are used to control the position of an indicator element which moves initially under the influence of a command signal, produced by movement of the vehicle controls, but is then supplemented by an actual attitude signal produced by a gyro as the vehicle controls are neutralized and the vehicle has assumed the command attitude.

Another object of the present invention is to provide an instrument and system of the character described wherein the visual indicator moves relative to the instrument face in the same direction as the vehicle moves relative to the actual horizon.

Another object of the present invention is to provide an instrument and system of the character described wherein the indicator element moves only momentarily in the direction commanded by the pilot controls and is thereafter influenced solely by the actual attitude of the vehicle as a means of assurance to the pilot that the controls have been conditioned to give the response desired prior to actual change in the attitude of the vehicle.

Still further objects and advantages of the present invention will become apparent to those skilled in the art from the following specification and appended claims and from the accompanying drawings wherein:

FIG. 1 is a front view of the instrument case;

FIG. 2 is a rear view of the instrument case;

FIG. 3 is a cross sectional view taken along lines 3—3 of FIG. 1;

FIG. 4 is a cross sectional view taken along lines 4—4 of FIG. 1;

FIG. 5 is a diagram of the preferred control system with dotted line portions indicating an alternate system for obtaining a momentary command signal;

FIG. 5A is a side elevation of a modified form of mechanical connection for a differential autosyn used in obtaining a momentary command signal;

FIG. 5B is a cross sectional view taken along lines 5B—5B of FIG. 5A;

FIGS. 6 through 12 are a series of schematic illustrations showing the operation of the instrument through conventional banking maneuvers of an aircraft;

FIGS. 13 through 17 are a series of schematic illustrations showing the operation of the instrument through a conventional climbing maneuver of an aircraft; and FIG. 18 illustrates the appearance of the instrument during a climb and bank maneuver.

Although the present embodiments of the invention will be described in connection with the attitude control of an aircraft, it will be understood that the instrument and system is not limited to such use but may be used with any vehicle to control its attitude relative to a fixed reference in space.

Referring now to the accompanying drawings, an instrument case is illustrated which may be of a conventional cylindrical design having the wall 1, a back panel 2 and a front cover in the form of an annular ring 3. The front cover ring 3 is fixed relative to the instrument housing 1 by means of screws or the like 4 and is located forwardly of a front panel 5 which is also fixed to the instrument case and comprises a mask or background against which the indicator member is viewed. The mask 5 is provided with a vertical slot 6 as seen by the pilot which may be marked with radial lines 7 indicating the center line of the instrument face and, as will be presently understood, representing to the pilot a simulated horizon relative to which the indicator moves. The indicator element 8 may be in any desired form such as a miniature aircraft or the like with characteristics to permit identification of top and bottom. The element 8 is fixed to a shaft 9 which extends through the slot 6 and is drivingly connected to the shaft 11 by a universal drive connection 12. The shaft 11 is driven by a servo motor 13 through a gear reduction unit 14 to provide an indication of the actual roll and command information in a manner to be described.

Surrounding the shaft 9 is a sleeve 16 within which the shaft rotates and which also extends through the opening 6 in the mask and is provided with radially extending and rotationally fixed arms 17 and 18 which, as will be presently understood, represent the degree of bank required for standard right and left turns. The sleeve 16 extends to the rear of the instrument and is provided with a collar 19 which has a laterally extending arm 21 pivoted as at 22 coaxially with the universal connection 12 of the rod 9. With this construction, it will be seen that the shaft 9 may be rotated freely about its longitudinal axis and pivoted about the universal 12 in a vertical plane as illustrated by the dotted line portions of FIG. 4. Lateral movement of the shaft and sleeve are prevented by virtue of the pivotal connection of the arm 21. The sleeve and shaft are rotated in the vertical plane by means of a crank arm 23 driven by the shaft 24 which is in turn driven by the servo motor 26 through the gear reduction train 27. The crank arm 23 is pivotally connected to a collar 28 which is slidably received on the sleeve 16. FIG. 4 shows the movement of the crank arm and sleeve 16 in the vertical plane. The motor 26 is driven responsive to both command signals and actual attitude signals as will presently be described.

The ring 3 is provided with a conventional glass or window 29 held in place by the snap ring 31 or its equivalent and an annular flange 32 which, as seen in FIG. 1, will be graduated in terms of degrees of bank both right and left.

Mounted for rotation within the ring 3 is a bezel ring 33 which may be held in place by a snap ring 34 or the like. The ring 33 is provided with gear teeth 36 on its inner periphery and is driven by the pinion 37 on the shaft 38. The shaft 38 is driven by the servo motor 39 through the gear reduction 41. The servo motor 39 is driven in response to a signal from a gyro representing the actual roll attitude of the aircraft with reference to the horizon in contrast to the differentially combined angles of control position and actual roll attitude which actuates servo motor 13. The bezel ring 33 is provided with an inwardly extending indicator arm 42 which is fixed thereto and includes a pointer 43 so located as to travel adjacent the inner periphery of the flange 32 whereby the actual bank attitude of the aircraft may be read at any time.

To complete the structure of the instrument housing, a pitch trim knob 46 is located at any position around the periphery of the instrument housing and is connected to a shaft 47 which extends through the housing and connects to a pitch trim differential autosyn 48 the function of which will presently be discussed.

Referring now to FIG. 5, the control system for providing the signals for operating the servo motors 13, 26 and 39 will be described. A conventional vertical gyroscope 49 is utilized to obtain a roll output signal and a pitch output signal in a well known manner by means of autosyn type pickoffs or equivalent electro mechanical converters capable of producing electrical signals which are representative of the pitch attitude as well as the roll attitude of the aircraft. Following the diagram in FIG. 5, the roll output signal is fed directly to the roll attitude control transformer 51, to a roll attitude amplifier 52 and from thence to the servo motor 39 for driving the shaft 38 and the bezel 33. The control transformer 51 is positioned by the servo motor 39 through the meshing gears 53, 54 and gear drive 55 with the gear drive ratio between pinion gear 37 and bezel 33 being the same as the gear drive ratio between the gear 53 and the rotor of the control transformer 51 to provide a one to one ratio between the control transformer 51 and the bezel 33. The ring 33 and consequently the indicator 43 will be driven in direct proportion to the degree of roll about the roll axis of the aircraft and in the same direction relative to the vertical center line of the instrument face as the airplane rolls relative to the true vertical plane. A 30° right bank attitude will cause the indicator 43 to move clockwise on the face of the instrument to the 30° right bank indexed on the flange 32. Thus the movement between the gyroscope and its mounting or the airplane fuselage about the roll axis is reflected by movement of the indicator 43 relative to the face of the instrument and in the direction of the roll of the airplane about its roll axis.

The roll output signal from the gyro 49 is also delivered to a roll differential autosyn 56 which is driven by the control rod 57 representing the means for controlling the attitude of the aircraft about its roll axis such as by ailerons or the like. The differential autosyn 56 serves to modify the roll output signal according to the position of the aircraft controls. Thus, when the aircraft is in level flight there will be no roll output signal from the vertical gyro and, if the controls are neutralized, there will be no output from the differential autosyn 56. When the pilot initially operates his controls a signal will be produced by the differential autosyn 56 and, as the aircraft begins to follow up and go into the command roll attitude, the signal from the differential autosyn 56 will be a combined signal of actual roll and command roll. As the pilot brings his controls back to neutral, the differential autosyn 56 will be returned to its null position so that the signal beyond the differential autosyn 56 will be an actual roll attitude signal. The signal from the differential autosyn 56 is fed to a control transformer 58 and then through a roll command amplifier 59 and to the servo motor 13 which drives the shaft 9 as previously described. The control transformer 58 is driven from the servo motor by means of the gears 61 and 62.

The shaft 9 which carries the indicator element 8 will be rotated about the axis of the shaft in the same direction as the aircraft fuselage is rotated about its roll axis relative to the horizon. The degree of right or left hand rotation of the indicator 8 relative to the instrument face and to the fixed indicators 17 and 18 will correspond directly to the amount of roll of the fuselage about its roll axis.

In a like manner, the pitch output signal from the gyro 49 is modified by the pitch differential autosyn 63 which is driven by the control shaft 57. The signal from the differential autosyn 63 is delivered to a pitch trim differential autosyn 48 the function of which will be presently described. The pitch attitude signal then passes through the control transformer 64, to the pitch command amplifier 66 and then to the servo motor 26 which drives the crank arm 23. In this manner, the swinging of the shaft 9 and sleeve 16 in the vertical plane is controlled both as a function of the actual pitch attitude of the aircraft and the command signal produced by the differential autosyn 63.

To initially insure that the indicator 8 is located in alignment with the radial lines 7 when the aircraft is in level flight, the pitch trim differential autosyn 48 may be adjusted if necessary by means of the pitch trim control knob 46 which positions the rotor of the differential autosyn 48. It will be understood, of course, that equivalent servo mechanisms or synchro systems capable of taking off signals from a gyroscope and providing a representative rotation of an output shaft may be utilized.

The vertical gyro incorporated in the present embodiment is well known in the state of the art. It is usually described as a remote, vertical gyro with non-tumbling characteristics. The non-tumbling characteristics are provided by stops in the gimbal mounting that do not permit free rotation of the gimbals through all degrees of pitch change. As the gimbals are rotated in pitch and as a near vertical position is reached the gyroscope inner gimbal comes in contact with a stop which causes a controlled precession to take place. The controlled precession is through 180° and about the roll aris with the result, in the present system, of inverting the indicator element 8 to indicate to the pilot that he is in inverted flight. The controlled precession does not affect the usefulness of the gyro and should not be confused with a tumbled gyro or a gyro with restricted degrees of freedom.

Referring now to FIGS. 6 through 12, the functioning of the instrument and system during a typical 30° right bank will be described in detail. As shown in FIG. 6, indicator 8 will be aligned with the radial line 7 on the mask 5 when the aircraft is in level flight. In FIGS. 6 through 12, the true horizon is represented by the line 67, the aircraft wings at 68 and the ailerons at 69. As aforementioned, the indicators 17 and 18 may be located at an angle with the radial lines 7 so as to represent a standard right or left bank.

When in level flight, there is no roll output signal from the gyro and, until the pilot operates the controls, the differential autosyn 56 is in its null position so that the servo motor 13 positions the indicator 8 in the level flight position. It will also be noted that the indicator 43 at this time reflects 0° bank since no signal is being received by the servo motor 39. Assuming that the pilot desired to make a standard right bank, the controls are operated so as to rotate the shaft 57 in a conventional manner and to position the ailerons as shown in FIG. 7. Turning of the controls to the right results, through action of the differential autosyn 56, in rotation of the indicator 8 to the right, and in this case, to coincide with the standard bank indicator 17. This may be done visually so that all the pilot must do is to turn his controls and observe the indicator 8 until it reaches the stationary indicator 17. This condition is shown in FIG. 7. As the aircraft begins to respond and goes into the turn, a signal will be produced by the gyro 49 which combines with the signal from the differential autosyn 56. The combined signal tends to move the indicator 8 beyond the indicator 17 which is a signal to the pilot to begin to neutralize his controls. This condition is shown in FIG. 8 as the pilot has started to move his ailerons back to the neutral position and in doing so the indicator 8 is held on the standard bank position. It will be noted that, at this time the indicator 43 starts to travel relative to the flange 32 to give the pilot a true picture of the actual roll attitude of the aircraft as it approaches the standard bank.

By the time the controls have been neutralized as illustrated in FIG. 9, the differential autosyn 56 has been moved to its null position and the indicator 8 is under the influence of the roll output signal of the gyro and the aircraft continues to the standard bank as indicated by the member 8. The indicator 43 will also reflect this degree of bank. When the pilot desires to return to aircraft to the level flight, the controls are operated so as to drive the differential autosyn 56 and return the indicator 8 to the level flight indication shown in FIG. 10. By the time the controls have been returned to the neutral position and the differential autosyn 56 returned to its null position, the aircraft will have returned to its level flight attitude shown in FIG. 12. Indicator 8 will be in alignment with the radial lines 7 with no signals being received by either of the servo motors 13 or 39.

Referring to FIGS. 13 through 17, the function of the instrument during an ascending maneuver is illustrated. Referring to FIG. 13, as soon as the pilot operates the control to drive the differential autosyn 63, and in this case to a climb attitude, the indicator 8 is caused to move vertically by the crank arm 23 driven by servo motor 26, which indicates to the pilot that the controls have been set to ascend to a given pitch angle. Because of the location of the collar 28 along the length of the shaft 9 and the arcuate path through which it moves about the axis of the shaft 24 to pivot the shaft 9, the relative movement of the indicator is greatest at the mid-portion of its arc or level flight indicating position and decreases as the indicator approaches its upper and lower limits. Thus the relationship between the rotation of the shaft 24 and the movement of the indicator 8 is not a linear or straight line function but is characterized by a sign curve or may be said to have sign wave characteristics. Graduations may be provided along the slot 6 to indicate the degree of pitch angle. As shown in FIG. 14 the pilot begins to neutralize the controls in order to hold the indicator 8 in the particular degree of climb or pitch attitude desired. By the time the controls are neutralized, the indicator 8 is under the influence of the actual pitch output signal and represents the true pitch attitude of the aircraft. FIGS. 16 and 17 represent the position of the control indicator as the pilot moves the controls to return to level flight and again neutralizes the controls.

Although the function of the instrument has been described for separate bank and pitch attitude response, the two functions are performed simultaneously such that the indicator 8 may be in any position of rotation indicating the roll attitude and may be either reflecting a climb or descent pitch attitude. FIG. 18 indicates, for instance, a right bank and climb attitude with the indicator 8 being above the radial lines 7 and rotated to indicate the degree of right bank. With the present instrument, the pilot may fly his airplane by merely observing the indicator 8 with its relative rotational and translational position relative to the radial lines 7 and the indicators 17 and 18 giving a visual indication which needs no interpretation since the movement corresponds directly to the movement of the aircraft relative to the horizon.

FIG. 5 also illustrates an alternate means for obtaining a momentary command signal to indicate the direction but not the magnitude of the movement of the controls. The alternate system involves the use of two additional differential autosyns 67 and 68 associated with the previously described differential autosyns 56 and 63 respectively and an alternate signal flow path shown in dotted lines in FIG. 5. The autosyns 67 and 68 may be identical conventional differential autosyns with a modified form of mechanical drive connection. The details of the connection for differential autosyn 67 are illustrated in FIGS. 5A and 5B and will be understood to be identical with that for the differential autosyn 68.

As shown by the dotted lines in FIG. 5, in the alternate embodiment, the differential autosyns 67 and 68 are placed in series when the momentary command indication is desired. The signal for controlling the servo motor 13 is thus the roll output signal from the gyro 49 as well as the combined signals from the differential autosyns 56 and 67. Likewise, the signal supplied to control servo motor 26 is the pitch output signal as well as the combined signals from the differential autosyns 63 and 68. Because of the placement of the drive means for the associated differential autosyns 63–68, their rotation is in opposite directions which normally causes one to cancel the other out. In the case of differential autosyns 56–57, the rotation of the electric field in autosyn 67 may be reversed as a means by which one autosyn cancels the other since their shafts are rotated in the same direction. The drive arrangement for the autosyns 67 and 68, however, provides for a lag or delay by means of a dampening assembly and an inertia wheel. This arrangement is shown in detail in FIGS. 5A and 5B.

As shown in FIGS. 5A and 5B the differential autosyn has a conventional rotor shaft 69 which has an inertia wheel 71 fixed thereto. A gear wheel 72 is mounted for free rotation on shaft 69 and is caused to rotate by movement of the control shaft 57. The gear wheel 72 is connected to the inertia wheel 71 by means of the dashpot assembly 73 and springs 74. The springs 74 have one end connected to pins 76 on the gear wheel and the other end connected to a bracket 77 fixed to the inertia wheel 71. The adjustable stop screws 78 limit the amount of relative rotation between the gear 72 and the wheel 71 to only a few degrees. The dashpot assembly has its cylinder 79 connected to the wheel 71 and its piston rod 81 connected to the gear 72.

In operation, the effect of the damping dashpot assembly 73 and the spring connection with the inertia wheel 71 is the cause of the movement of the autosyns 67 and 68 to lag momentarily the movement of the autosyns 56 and 63. When this lag is overcome, the signals from the associated autosyns being equal and opposite cancel each other out. As a result, the indicator 8 will be caused to immediately rotate a small amount in the direction in which the controls are rotated then in short order return to a position which represents the actual roll attitude of the aircraft. It is therefore a means of indicating the direction in which the aircraft will roll if the controls are further moved in the indicated direction. Stated in another manner, it provides a means of momentarily confirming the direction in which it is desired to rotate the aircraft. Thus, in the case of large aircraft, or aircraft which are slow in responding to control actuation a "feel" or immediate "feed back" is provided to confirm the correctness of control movement. The amount of movement and the rapidity of movement of the indicator 8 are controlled by limiting screws 78 and by an adjustable orifice 82 in the dashpot. These adjustments are necessary to adapt the system to optimum operation in various classes of aircraft.

From the foregoing, it will be apparent to those skilled in the art that the flight instrument and system according to the present invention provides new and useful improvements of the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In an instrument for indicating pitch and roll attitude information for a vehicle, a substantially planar mask on the face of the instrument, a vertical slot in said mask, an indicator element for representing roll position of the vehicle about its longitudinal axis, means mounting said element for movement in a substantially flat arc along said slot about a first axis spaced from said mask and for concurrent rotation about a second axis passing through said slot and normal to said first axis, and means to move said indicator element about said first and second axes responsive to pitch and roll attitude information respectively related to said vehicle, the movement of the element along said arc being upwardly to indicate ascent and downwardly to indicate descent, the rotational movement of the element about the second being in the same direction as the roll of the vehicle.

2. The device according to claim 1, wherein said mounting means comprises; a hollow shaft, means mounting said hollow shaft for swinging movement about said first axis, a second shaft extending through said hollow shaft and fixed at one end to said indicator, the longitudinal axis of said second shaft constituting said second axis, said second shaft being adapted for rotation about its axis and swinging motion at its other end about said first axis through a universal drive connection; and crank arm means pivotally connected along the length of said hollow shaft whereby rotation of said arm causes vertical movement of the indicator element along said arc with sine wave motion characteristics, the means to move the indicator about the first and second axes being connected to said crank arm and said universal drive connection respectively.

3. In combination with a vehicle having reference means establishing a fixed reference axis about which the vehicle moves, and pilot operated vehicle control means for controlling the attitude of the vehicle, an indicator system comprising; an indicator element visible to the pilot, means mounting said element for movement about a second axis which moves with the vehicle, first sensing means to sense movement of the vehicle about said reference axis, second sensing means for sensing movement of said vehicle control means, and drive means responsive to both said first and second sensing means to move said indicator element about said second axis in a direction and in proportional amounts corresponding to the movement of the vehicle relative to the reference axis and the degree of movement of the vehicle control means.

4. In combination with a vehicle having reference means establishing a fixed reference axis about which the vehicle moves and pilot operated vehicle control means for controlling the attitude of the vehicle, an indicator system comprising; an indicator element visible to the pilot, means mounting said element for movement about a second axis which moves with the vehicle, first sensing means to sense the movement of the vehicle about said reference axis, second sensing means for sensing movement of said vehicle control means, and drive means responsive to said first sensing means to move said indicator element about said second axis in a direction and in a proportional amount corresponding to the movement of the vehicle relative to the reference axis, said drive means being further responsive to said second sensing means to move said indicator supplementary to the action of said first sensing means, said indicator being initially positioned by movement of the controls to indicate a commanded vehicle attitude relative to the fixed reference axis, resulting movement of the vehicle about the reference axis tending to further move said indicator element about the second axis, whereby a commanded attitude may be set and maintained by moving the vehicle controls to position the indicator element in the desired attitude and returning the controls to the neutral position so as to hold the indicator element on the commanded attitude as the vehicle assumes the commanded attitude.

5. The device according to claim 3 wherein, said second sensing means senses the initial movement only of said control means, said second sensing means being operative to control said drive means to return said indicator an amount equal to its initial movement after a momentary delay, whereby the pilot is informed immediately of the correctness of the control movement for the desired attitude change and the indicator will then be moved by the drive means responsive to the movement of the vehicle about the reference axis.

6. The device according to claim 4 wherein; said first sensing means includes means to produce a first electrical signal which represents the vehicle attitude relative to the reference axis, said second sensing means includes means to produce a second electrical signal upon movement of said controls which represents the position of the controls to supplement said first signal, whereby the drive means is responsive to the combined first and second signals for positioning the indicator element.

7. The device according to claim 6 wherein; said reference means comprises a non tumbling vertical gyro operational to maintain a stable reference axis through 360° of roll attitude of the vehicle, said system including an indicator instrument case having a substantially planar mask fixed relative to the vehicle, said indicator element representing the roll position of the vehicle about its longitudinal axis and being mounted for rotation about said second axis on the face of said mask.

8. The combination according to claim 7 including a second indicator element, bezel ring means in said instrument case mounting said second indicator element for movement about a third axis fixed relative to the case, second drive means responsive to said first signal only to move the second indicator element about said third axis in a direction and in a proportional amount corresponding to the movement of the vehicle relative to the reference axis, and indicia means on said instrument associated with said second indicator element, whereby the exact degree of roll attitude may be read at any time.

9. The combination according to claim 4 including; a second indicator element, means mounting said second indicator element for movement about a third axis which is fixed relative to the vehicle, second drive means responsive to said first sensing means only to move the second indicator element about said third axis in a direction and in a proportional amount corresponding to the movement of the vehicle relative to the reference axis.

10. In combination with a vehicle having reference means establishing the pitch and roll axes about which the vehicle moves, an indicator system comprising; an indicator element visible to the pilot, means mounting said element for movement about a second set of axes which move with the vehicle, pilot operated control means for controlling the pitch and roll attitude of the vehicle, first sensing means to sense movement of the vehicle about said reference axes, second sensing means for sensing movement of the control means, and drive means responsive to said first sensing means to move the indicator element about said second set of axes in directions and in proportional amounts corresponding to the movement of the vehicle relative to the reference axes, said drive means being further responsive to said second sensing means to move said indicator supplementary to the action of said first sensing means, said indicator being initially positioned by movement of the controls to indicate a commanded vehicle attitude relative to the reference axes, resulting movement of the vehicle about the reference axes tending to further move said indicator element about the corresponding second axes, whereby a commanded attitude may be set and maintained by moving the vehicle controls to position the indicator in the desired attitude and returning the controls to the neutral position so as to hold the indicator element on the commanded attitude as the vehicle assumes the commanded attitude.

References Cited

UNITED STATES PATENTS

| | | | |
|---|---|---|---|
| 2,487,809 | 11/1949 | Hoover et al. | 33—204 |
| 2,489,294 | 11/1949 | Kenyon | 33—204 |
| 2,567,212 | 9/1951 | Klopp et al. | 340—27 |
| 3,002,381 | 10/1961 | Castro et al. | 73—178 |

JOHN W. CALDWELL, Primary Examiner

A. H. WARING, Assistant Examiner

U.S. Cl. X.R.

33—204; 73—178; 116—36